US012726028B2

(12) United States Patent
Zhou et al.

(10) Patent No.: US 12,726,028 B2
(45) Date of Patent: Sep. 1, 2026

(54) CAPACITY CONFIGURATION METHOD AND SYSTEM OF ENERGY STORAGE IN MICROGRID

(71) Applicant: Hefei University of Technology, Hefei (CN)

(72) Inventors: Kaile Zhou, Hefei (CN); Kunshu Zhou, Hefei (CN); Shanlin Yang, Hefei (CN)

(73) Assignee: Hefei University of Technology, Hefei City (CN)

(*) Notice: Subject to any disclaimer, the term of this patent is extended or adjusted under 35 U.S.C. 154(b) by 1048 days.

(21) Appl. No.: 17/866,977

(22) Filed: Jul. 18, 2022

(65) Prior Publication Data

US 2022/0368131 A1 Nov. 17, 2022

(30) Foreign Application Priority Data

May 6, 2022 (CN) ......................... 202210487370.7

(51) Int. Cl.
*H02J 3/17* (2026.01)
*H02J 3/00* (2026.01)
*H02J 3/32* (2026.01)

(52) U.S. Cl.
CPC ................ *H02J 3/17* (2026.01); *H02J 3/003* (2020.01); *H02J 3/32* (2013.01)

(58) Field of Classification Search
CPC .... H02J 3/144; H02J 3/003; H02J 3/32; H02J 2203/20; H02J 2300/24; H02J 3/38; Y04S 10/50; G06N 3/049; G06N 3/084; G06N 3/088
See application file for complete search history.

(56) References Cited

U.S. PATENT DOCUMENTS

2023/0103426 A1* 4/2023 Hong ..................... G06N 3/092 700/295

FOREIGN PATENT DOCUMENTS

CN 111064192 A 4/2020
CN 111859605 A 10/2020
CN 112257941 A * 1/2021 ............. G06N 3/045
CN 114021437 A * 2/2022 ............. G06N 3/045
CN 114301089 A * 4/2022

OTHER PUBLICATIONS

English Machine Translation of CN114301089A, pp. 1-40 (Year: 2022).*
English Machine Translation of CN114021437A, pp. 1-36 (Year: 2022).*

(Continued)

*Primary Examiner* — Robert E Fennema
*Assistant Examiner* — Magdalena I Kossek

(57) ABSTRACT

A capacity configuration method and system of energy storage in a microgrid. In this application, the time-series data related to photovoltaic power generation is acquired and processed to obtain the preprocessed time-series data; a time-series generative adversarial network (Time GAN) is trained based on the preprocessed time-series data to perform data enhancement to obtain enhanced time-series data; and based on the enhanced time-series data, a distributionally robust optimization model is used to perform capacity configuration of energy storage.

3 Claims, 2 Drawing Sheets

(56) References Cited

OTHER PUBLICATIONS

English Machine Translation of CN112257941A, pp. 1-36 (Year: 2021).*

Q. Zhao, W. Liao, S. Wang and J. R. Pillai, "Robust Voltage Control Considering Uncertainties of Renewable Energies and Loads via Improved Generative Adversarial Network," in Journal of Modern Power Systems and Clean Energy, vol. 8, No. 6, pp. 1104-1114, Nov. 2020, doi: 10.35833/MPCE.2020.000210 (Year: 2020).*

S. M. Sadek, W. A. Omran, M. A. M. Hassan and H. E. A. Talaat, "Data Driven Stochastic Energy Management for Isolated Microgrids Based on Generative Adversarial Networks Considering Reactive Power Capabilities of Distributed Energy Resources and Reactive Power Costs," in IEEE Access, vol. 9, pp. 5397 (Year: 2021).*

C. Ning and F. You, "Data-Driven Ambiguous Joint Chance Constrained Economic Dispatch with Correlated Wind Power Uncertainty," 2021 American Control Conference (ACC), New Orleans, LA, USA, 2021, pp. 1811-1816, doi: 10.23919/ACC50511.2021.9482742. (Year: 2021).*

* cited by examiner

CAPACITY CONFIGURATION METHOD AND SYSTEM OF ENERGY STORAGE IN MICROGRID

CROSS-REFERENCE TO RELATED APPLICATIONS

This application claims the benefit of priority from Chinese Patent Application No. 202210487370.7, filed on May 6, 2022. The content of the aforementioned application, including any intervening amendments thereto, is incorporated herein by reference in its entirety.

TECHNICAL FIELD

This application relates to energy storage capacity configuration, and more particularly to a capacity configuration method and system of energy storage in a microgrid.

BACKGROUND

Considering that the energy storage system struggles with the high cost per unit capacity, expensive investment cost and high operation and maintenance cost, it is restricted for the energy storage system to be widely promoted and applied in the microgrid. For that reason, it is needed to take effective methods to optimize the capacity configuration of the energy storage system. As a typical problem, the capacity optimization of the energy storage equipment requires corresponding historical data as support in the solving process. However, the capacity of the energy storage equipment is required to be planned in the early stage of the microgrid construction, but the data of the microgrid at that time is insufficient. Under such circumstance, it is important to manage the uncertainty of photovoltaic power generation and plan for capacity configuration of the energy storage.

At present, three main methods for managing the uncertainty of photovoltaic power generation include stochastic optimization, robust optimization and distributionally robust optimization. In the stochastic optimization, it is generally assumed that the photovoltaic power obeys a given probability distribution, so as to model the uncertainties. In the robust optimization, an uncertainty set is applied to represent the variation range of the photovoltaic power, and a satisfactory solution with good performance feasible in all uncertainties is sought. In the distributionally robust optimization, the advantages of the stochastic optimization and the advantages of the stochastic optimization are combined. Based on the uncertainties in the probability distribution function, the probability distribution of the photovoltaic output scenario under the worst-case scenario is sought to describe the uncertainty of photovoltaic output.

However, in the traditional stochastic optimization, it is difficult for the existing probability distribution function to accurately describe the fluctuation of photovoltaic power generation. In addition, the traditional robust optimization directly makes decisions according to the worst-case scenario in the uncertainty set, making the optimization solution more conservative. Although combined the strengths of the stochastic optimization and the robust optimization, the distributionally robust optimization requires a large amount of data when solving and it is hard for some newly-built microgrids to acquire sufficient data to satisfy the conditions. Hence, the effective method for accurately configuring the energy storage capacity in the newly-built microgrids needs to be developed.

SUMMARY

An objective of this application is to provide a capacity configuration method and system of energy storage in a microgrid to overcome the inaccurate capacity configuration of energy storage in the newly-built microgrids.

In order to achieve those objectives, technical solutions of this application are described as follows.

In a first aspect, this application provides a capacity configuration method of energy storage in a microgrid, comprising:

acquiring time-series data related to photovoltaic power generation, and performing preprocessing of the time-series data related to the photovoltaic power generation to obtain preprocessed time-series data; training a time-series generative adversarial network (Time GAN) based on the preprocessed time-series data to perform data enhancement to obtain enhanced time-series data; wherein the Time GAN comprises an embedded network and a generative adversarial network (GAN); and based on the enhanced time-series data, using a distributionally robust optimization model to perform capacity configuration of energy storage.

In an embodiment, the time-series data related to the photovoltaic power generation comprises photovoltaic power data, global horizontal radiation and diffuse horizontal radiation data, temperature data, and humidity data; the preprocessing comprises data cleaning processing, data integration processing, data transformation processing, data reduction processing, and data standardization processing.

In an embodiment, the Time GAN comprises an embedded network and a generative adversarial network (GAN); and the step of "training a time-series generative adversarial network (Time GAN) based on the preprocessed time-series data to perform data enhancement to obtain enhanced time-series data" comprises:

(S21) training the embedded network based on the time-series data; and the embedded network is formed by embedding a function used for dimensionality reduction of the time-series data into an autoencoder;

(S22) training a generator and a discriminator in the GAN based on the time-series data; and (S23) performing the data enhancement on the time-series data via joint-training of the embedded network and the GAN.

In an embodiment, the distributionally robust optimization model comprises:

an objective function of the distributionally robust optimization model is expressed as follows:

$$C = C_1 + C_2;$$

$$C_1 = r_e \times C_1' \times \frac{S}{D};$$

$$r_e = \frac{d(1+d)^y}{365 \times [(1+d)^y - 1]};$$

$$C_2 = p_{g,t} \times \sum_{t=1}^{T}(V_{chp,t}) + p_t \times \sum_{t=1}^{T}(P_{grid,t}) + \left[\sum_{t=1}^{24}\left(|p_t^c| + |p_t^d|\right)\Delta t \times C_{ess}\right];$$

where C is the total investment cost of energy storage; $C_1$ indicates the daily average investment cost of energy storage battery; $C_2$ indicates the daily operating cost; $r_e$ indicates the fund recovery factor;

$$C_1'$$

indicates the investment cost per unit capacity of energy storage battery; S indicates energy storage configuration capacity; D indicates the depth of discharge of the energy storage battery; d indicates the discount rate; y indicates the investment life of the energy storage battery; $p_{g,t}$ indicates the price of natural gas at time t; $V_{chp,t}$ indicates the amount of natural gas purchased at time t; $p_t$ indicates the price of purchased electricity at time t; $P_{grid,t}$ indicates the amount of electricity purchased at moment t;

$$p_t^c \text{ and } p_t^d$$

indicate the charging and discharging power of energy storage at moment t, respectively; and $C_{ess}$ indicates the cost per unit charge and discharge of the energy storage battery;

constraints of the objective function comprise:

a. an operation constraint of energy storage equipment is expressed as follows:

$$\begin{cases} SOC_{t+1} = SOC_t(1-\varphi) + \left(p_t^c \cdot \eta - \dfrac{p_t^d}{1-\eta}\right)\Delta t \\ p_{min}^c \le p_t^c \le p_{max}^c \\ p_{min}^d \le p_t^d \le p_{max}^d \\ SOC_{t,min} \le SOC_t \le SOC_{t,max} \end{cases};$$

where $SOC_t$ is the capacity of the battery at time t; φ is the self-discharging rate of the battery; η is the charging efficiency of the battery;

$$p_t^c$$

is the charging power of the battery at time t;

$$p_t^d$$

is the discharging power of the battery at time t;

$$p_{min}^c$$

is the minimum charging power of the battery;

$$p_{max}^c$$

is the maximum charging power of the battery;

$$p_{min}^d$$

is the minimum discharging power of the battery;

$$p_{max}^d$$

is the maximum discharging power of the battery; and Δt is dispatching time interval;

b. an operation constraint of a gas turbine is expressed as follows:

$$\begin{cases} P_{gt,t} = V_{chp,t} \times J \times \omega \\ H_{gt,t} = V_{chp,t} \times J \times (1-\omega) \\ P_{gt}^{min} \le P_{gt,t} \le P_{gt}^{max} \end{cases};$$

where $V_{chp,t}$ is the amount of natural gas purchased at time t; ω is the electrical efficiency of the gas turbine; J is the heat value of the natural gas; $H_{gt,t}$ is the thermal power output by the gas turbine at time t;

$$P_{gt}^{min}$$

is the upper limit of electrical power of the gas turbine; and $$P_{gt}^{max}$$

is the lower limit of the electrical power of the gas turbine.

c. a constraint of power balance is expressed as follows:

$$\begin{cases} P_{grid,t} + P_{pv,t} + p_t^d - p_t^c + P_{gt,t} = P_{load,t} \\ H_{gt,t} = H_{load,t} \end{cases};$$

where $P_{grid,t}$ represents the power transmission between the microgrid and the main grid at time t; $P_{pv,t}$ is the power output of the photovoltaic power generation at time t;

$$p_t^c$$

is the charging power of the energy storage battery at time t;

$$p_t^d$$

is the discharging power of the of the energy storage battery at time t, $P_{load,t}$ is the total electrical load demand of the microgrid at time t; $H_{gt,t}$ is the thermal power output of the gas turbine at time t; and $H_{load,t}$ is the total heat load demand of the microgrid at time t; and an ambiguity set $M^{\varepsilon}$ used for measuring an uncertainty of the distributionally robust optimization model is shown as follows:

$$M^{\varepsilon} = \{P_{\hat{p}} \in M(\xi): d_W(P_{\hat{p}}, \hat{P}) \le \varepsilon\};$$

where $P_{\hat{p}}$ is the probability distribution of the actual output power of the photovoltaic power generation; $\hat{P}$ is the empirical distribution of the photovoltaic power generation; M(ξ) is all probability distribution spaces defined by Wasserstein distance $d_W$; and ε is radius of the ambiguity set W.

In an embodiment, the step of "using a distributionally robust optimization model to perform capacity configuration of energy storage" comprises:

solving the distributionally robust optimization model by a commercial solver to obtain a solution result; and performing the capacity configuration of energy storage based on the solution result.

In a second aspect, this application provides a capacity configuration system of energy storage in a microgrid, comprising:

a data acquisition and preprocessing module;

a time-series generative adversarial network (Time GAN) photovoltaic power generation scenario generation module; and an energy storage capacity optimization and output module;

wherein the data acquisition and preprocessing module is configured to acquire time-series data related to photovoltaic power generation and preprocess the time-series data related to the photovoltaic power generation to obtain preprocessed time-series data;

the time-series generative adversarial network (Time GAN) photovoltaic power generation scenario generation module is configured to train the Time GAN to perform data enhancement based on the preprocessed time-series data to obtain enhanced time-series data; the Time GAN comprises an embedded network and a generative adversarial network (GAN); and the energy storage capacity optimization and output module is configured to use the distributionally robust optimization model to perform capacity configuration of energy storage based on the enhanced time-series data.

In an embodiment, the time-series data related to the photovoltaic power generation comprises photovoltaic power data, global horizontal radiation and diffuse horizontal radiation data, temperature data, and humidity data; the preprocessing comprises data cleaning processing, data integration processing, data transformation processing, data reduction processing, and data standardization processing.

In an embodiment, the time-series generative adversarial network (Time GAN) photovoltaic power generation scenario generation module is configured to train the Time GAN to perform data enhancement based on the preprocessed time-series data to obtain enhanced time-series data; the Time GAN comprises an embedded network and a generative adversarial network (GAN); the time-series generative adversarial network (Time GAN) photovoltaic power generation scenario generation module is operated through steps of:

(S21) training the embedded network based on the time-series data; and the embedded network is formed by embedding a function used for dimensionality reduction of the time-series data into an autoencoder;

(S22) training a generator and a discriminator in the GAN based on the time-series data; and (S23) performing the data enhancement on the time-series data via joint-training of the embedded network and the GAN.

In an embodiment, the distributionally robust optimization model comprises:

an objective function of the distributionally robust optimization model is expressed as follows:

$$C = C_1 + C_2;$$

$$C_1 = r_e \times C_1' \times \frac{S}{D};$$

$$r_e = \frac{d(1+d)^y}{365 \times [(1+d)^y - 1]};$$

$$C_2 = p_{g,t} \times \sum_{t=1}^{T}(V_{chp,t}) + p_t \times \sum_{t=1}^{T}(P_{grid,t}) + \left[\sum_{t=1}^{24}\left(|p_t^c| + |p_t^d|\right)\Delta t \times C_{ess}\right];$$

where C is the total investment cost of energy storage; $C_1$ indicates the daily average investment cost of energy storage battery; $C_2$ indicates the daily operating cost; $r_e$ indicates the fund recovery factor;

$$C_1'$$

indicates the investment cost per unit capacity of energy storage battery; S indicates energy storage configuration capacity; D indicates the depth of discharge of the energy storage battery; d indicates the discount rate; y indicates the investment life of the energy storage battery; $p_{g,t}$ indicates the price of natural gas at time t; $V_{chp,t}$ indicates the amount of natural gas purchased at time t; $p_t$ indicates the price of purchased electricity at time t; $P_{grid,t}$ indicates the amount of electricity purchased at moment t;

$$p_t^c \text{ and } p_t^d$$

indicate the charging and discharging power of energy storage at moment t, respectively; $C_{ess}$ indicates the cost per unit charge and discharge of the energy storage battery;

constraints of the objective function comprise:

a. an operation constraint of energy storage equipment is expressed as follows:

$$\begin{cases} SOC_{t+1} = SOC_t(1-\varphi) + \left(p_t^c \cdot \eta - \frac{p_t^d}{1-\eta}\right)\Delta t \\ p_{min}^c \le p_t^c \le p_{max}^c \\ p_{min}^d \le p_t^d \le p_{max}^d \\ SOC_{t,min} \le SOC_t \le SOC_{t,max} \end{cases};$$

where $SOC_t$ is the capacity of the battery at time t; φ is the self-discharging rate of the battery; η is the charging efficiency of the battery;

$$p_t^c$$

is the charging power of the battery at time t;

$$p_t^d$$

is the discharging power of the battery at time t;

$$p^c_{min}$$

is the minimum charging power of the battery;

$$p^c_{max}$$

is the maximum charging power of the battery;

$$p^d_{min}$$

is the minimum discharging power of the battery;

$$p^d_{max}$$

is the maximum discharging power of the battery; and Δt is dispatching time interval;

b. an operation constraint of a gas turbine is expressed as follows:

$$\begin{cases} P_{gt,t} = V_{chp,t} \times J \times \omega \\ H_{gt,t} = V_{chp,t} \times J \times (1-\omega); \\ P_{gt}^{min} \le P_{gt,t} \le P_{gt}^{max} \end{cases}$$

where $V_{chp,t}$ is the amount of natural gas purchased at time t; ω is the electrical efficiency of the gas turbine; J is the heat value of the natural gas; $H_{gt,t}$ is the thermal power output by the gas turbine at time t;

$$P_{gt}^{min}$$

is the upper limit of electrical power of the gas turbine; and $$P_{gt}^{max}$$

is the lower limit of the electrical power of the gas turbine; and c. a constraint of power balance is expressed as follows:

$$\begin{cases} P_{grid,t} + P_{pv,t} + p_t^d - p_t^c + P_{gt,t} = P_{load,t} \\ H_{gt,t} = H_{load,t} \end{cases};$$

where $P_{grid,t}$ represents the power transmission between the microgrid and the main grid at time t;

$$p_t^d$$

is the power output of the photovoltaic power generation at time t;

$$p_t^c$$

is the charging power of the energy storage battery at time t; $P_{d,t}$ is the discharging power of the of the energy storage battery at time t, $P_{load,t}$ is the total electrical load demand of the microgrid at time t; $H_{gt,t}$ is the thermal power output of the gas turbine at time t; and $H_{load,t}$ is the total heat load demand of the microgrid at time t; and an ambiguity set $M^\varepsilon$ used for measuring an uncertainty of the distributionally robust optimization model is shown as follows:

$$M^\varepsilon = \{P_{\hat{p}} \in M(\xi):\ d_W(P_{\hat{p}}, \overline{P}) \le \varepsilon\};$$

where $P_{\hat{p}}$ is the probability distribution of the actual output power of the photovoltaic power generation; $\hat{P}$ is the empirical distribution of the photovoltaic power generation; M(ξ) is all probability distribution spaces defined by Wasserstein distance $d_W$; and ε is radius of the ambiguity set W.

In an embodiment, the distributionally robust optimization model is configured to perform the capacity configuration of energy storage, which is operated through a step of:

solving the distributionally robust optimization model by a commercial solver to obtain a solution result; and performing the capacity configuration of energy storage based on the solution result.

Compared with the prior art, this application has the following beneficial effects.

1. With regard to the method and the system provided herein, the time-series data related to photovoltaic power generation is acquired and processed to obtain the preprocessed time-series data; a time-series generative adversarial network (Time GAN) is trained based on the preprocessed time-series data to perform data enhancement to obtain enhanced time-series data; and based on the enhanced time-series data, a distributionally robust optimization model is used to perform capacity configuration of energy storage. The Time GAN is configured to perform data enhancement on the limited data obtained by the newly-built microgrid, so as to allow the energy storage capacity of the newly-built microgrid to be accurately configured using the distributionally robust optimization model when the data is extremely insufficient, improving the utilization efficiency of the data and the construction efficiency of the microgrid.

2. Compared with ordinary generative adversarial network (GAN), the Time GAN provided herein is configured to perform data enhancement, which considers not only the static characteristics of time-series data, but also the time characteristics of the data.

3. The distributionally robust optimization model is configured to perform the capacity configuration of energy storage, which takes the uncertainties of the photovoltaic power, allowing the capacity configuration of energy storage more accurate, lowering the construction cost of the microgrid, and enhancing the security performance of the microgrid during operation.

BRIEF DESCRIPTION OF THE DRAWINGS

In order to make the technical solutions of this disclosure clearer, this disclosure will be described in detail below with reference to the accompanying drawings and embodiments. Obviously, it should be noted that the embodiments described blow are merely some embodiments of this disclosure. It should be understood for those of ordinary skill in the art that other accompanying drawings can also be obtained by the following accompanying drawings without paying any creative efforts.

DETAILED DESCRIPTION OF EMBODIMENTS

Figure 1:
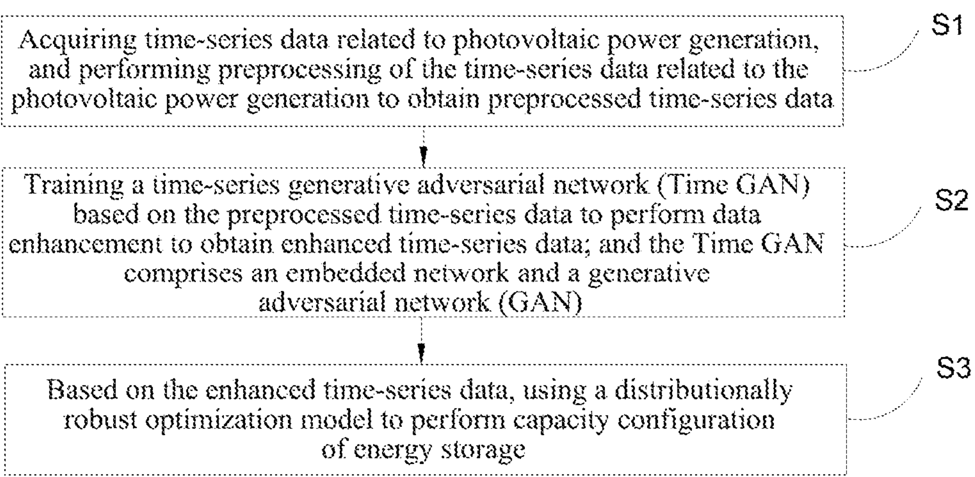
FIG. 1 is a flowchart of a capacity configuration method of energy storage in a microgrid according to an embodiment of this disclosure.
Figure 2:
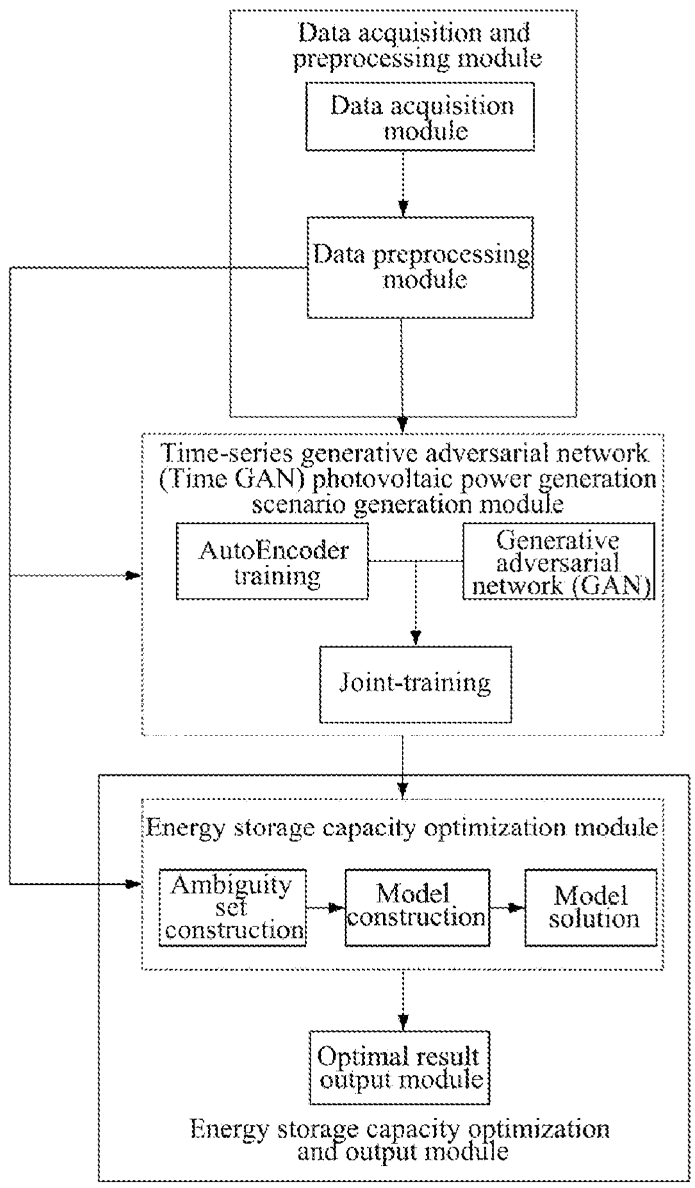
FIG. 2 is a flowchart of a capacity configuration system of energy storage in a microgrid according to an embodiment of this disclosure.

In order to make the objectives, technical solutions and beneficial effects in the embodiments of this disclosure more clear and complete, this disclosure will be described in detail below with reference to the accompanying drawings. Obviously, the embodiments described blow are merely some embodiments of this disclosure. Based on the embodiments of this disclosure, it should be understood that any modifications and replacements made by those skilled in the art without departing from the spirit of this disclosure should fall within the scope of this application defined by the appended claims.

An objective of this application is to provide a capacity configuration method and system of energy storage in a microgrid to overcome the inaccurate capacity configuration of energy storage in the newly-built microgrids, so as to realize the capacity configuration of the energy storage equipment in the newly-built microgrid, when the data is insufficient.

The technical solutions in the embodiments of this disclosure are provided to solve the above-mentioned technical problems, and the general idea is as follows:

In order to perform capacity configuration of the energy storage equipment in the newly-built microgrid with insufficient data, in this disclosure, time-series data related to photovoltaic power generation is acquired, and then preprocessed to obtain preprocessed time-series data; a time-series generative adversarial network (Time GAN) is trained based on the preprocessed time-series data to perform data enhancement to obtain enhanced time-series data; and based on the enhanced time-series data, a distributionally robust optimization model is used to perform capacity configuration of energy storage. In this disclosure, the capacity configuration of energy storage in the newly-built microgrid is allowed to be more accurate, even though the data of the newly-built microgrid is seriously insufficient, thereby improving the utilization efficiency of the data and the construction efficiency of the microgrid.

In order to better understand the above-mentioned technical solutions, this disclosure will be described in detail below with reference to the accompanying drawings and embodiments.

Embodiment 1

In a first aspect, provided herein is a capacity configuration method of energy storage in a microgrid. The method is performed as follows.

(S1) Time-series data related to photovoltaic power generation is acquired, and preprocessing of the time-series data related to the photovoltaic power generation is performed to obtain preprocessed time-series data.

(S2) A time-series generative adversarial network (Time GAN) is trained based on the preprocessed time-series data to perform data enhancement to obtain enhanced time-series data. The Time GAN includes an embedded network and a generative adversarial network (GAN).

(S3) Based on the enhanced time-series data, a distributionally robust optimization model is used to perform capacity configuration of energy storage.

In this embodiment, time-series data related to photovoltaic power generation is acquired, and then preprocessed to obtain preprocessed time-series data; a time-series generative adversarial network (Time GAN) is trained based on the preprocessed time-series data to perform data enhancement to obtain enhanced time-series data; and based on the enhanced time-series data, a distributionally robust optimization model is used to perform capacity configuration of energy storage. The Time GAN provided herein enables data enhancement of the limited data acquired by the newly-built microgrid, allowing the newly-built microgrid to make full use of the distributionally robust optimization model to perform accurate capacity configuration of the energy storage, even though the data of the newly-built microgrid is severely insufficient, thereby improving the utilization efficiency of the data and the construction efficiency of the microgrid.

Referring to an embodiment shown in FIG. 1 and the explanation of the steps of (S1)-(S3), the embodiment is specifically performed as follows.

(S1) Time-series data related to photovoltaic power generation is acquired, and preprocessing of the time-series data related to the photovoltaic power generation is performed to obtain preprocessed time-series data.

The environmental data such as photovoltaic power generation power data, global horizontal radiation and diffuse horizontal radiation data, temperature data, humidity data, etc. is acquired by sensors and photovoltaic panels during a certain period of time according to a certain collection frequency. The acquired environmental data is the time-series data related to photovoltaic power generation. The acquired environmental data is uploaded to a data acquisition module followed by preprocessing. The preprocessing includes data cleaning processing, data integration processing, data transformation processing, data reduction processing, and data standardization processing.

(S2) A time-series generative adversarial network (Time GAN) is trained based on the preprocessed time-series data to perform data enhancement to obtain enhanced time-series data. The Time GAN includes an embedded network and a generative adversarial network (GAN).

The time GAN is trained by a neural network training module. The time-series data related to photovoltaic power generation is allowed to be regarded as a sample space containing a static feature s and a temporal feature x, whose distribution is $p(S, X_{1:T})$, where T is a length of the data. The network training is performed as follows.

(Step 1) The embedded network (i.e., the autoencoder network) is trained. The static feature s is mapped to a lower dimension by embedding the function in the autoencoder, which can be expressed as $h_s=e_S(S)$, and then the temporal feature x is mapped to a lower dimension. What is different is that a temporal feature will be related to a previous temporal feature $h_{t-1}$ due to a static feature $h_s$, and thus is expressed as $h_t=e_X(h_s, h_{t-1},x_t)$. It is easier for the autoencoder network to learn the data to obtain the features via dimensionality reduction of the data. Then, the static feature $h_s$, and the temporal feature $h_t$ are respectively inversely mapped into the original static feature and temporal feature via a restoration function. An inverse mapping function of the static feature is expressed as $\bar{s}=r_S(h_s)$, and an inverse mapping function of the static feature is expressed as $\bar{x}=r_X(h_t)$, such that a loss function of the autoencoder network is obtained and expressed as follows:

$$\text{Loss}_R = E_{S,X_{1T\sim p}}\left[\|s-\bar{s}\|_2 + \sum_t \|X_t - \bar{X}_t\|_2\right]; \quad (1)$$

(Step 2) The GAN is trained, which is specifically performed by training a generator and a discriminator of the GAN. The autoencoder network is trained, and then the generator and the discriminator of the GAN are trained. Based on the static feature s of the time-series data, the generator is allowed to generate a static feature vector $\widehat{h_S}$ via a first function which is expressed as: $\widehat{h_S}=g_S(Z_S)$, which selects noise input obeys Gaussian distribution. Based on the temporal feature x of the time-series data and the static feature vector $\widehat{h_S}$, the generator is allowed to generate a temporal feature vector $\widehat{h_t}$ via a second function, which is expressed as: $\widehat{h_t}=g_X(\widehat{h_S}, \widehat{h_{t-1}}, z_t)$, which selects noise input of Wiener Process noise. The discriminator judges the difference between the data generated by the generator and the real data through the following two functions, which are expressed as $\tilde{y}_S=d_S(\tilde{h}_S)$; and $\tilde{y}_t=d_S(\overleftarrow{u_t}, \overrightarrow{u_t})$. In short, the discriminator is a binary classification neural network. Therefore, in this stage of training, two loss functions are included. One of the two loss functions is used to reflect the adversarial interaction between the response generator and the discriminator, which is exhibited as follows:

$$\text{Loss}_U = E_{S,X_{1,T-p}}\left[\log y_S + \sum_t \log y_t\right] + E_{S,X_{1,T-\hat{p}}}\left[\log(1-\widehat{y_S}) + \sum_t \log(1-\widehat{y_t})\right]; \quad (2)$$

The other loss function of the two loss functions is used to reflect the approximation level between the data generated by the generator and the data encoded by the autoencoder, which is exhibited as follows:

$$\text{Loss}_S = E_{S,X_{1,T\sim p}}\left[\sum_t \|h_t - g_X(h_S, h_{t-1}, z_t)\|_2\right]; \quad (3)$$

(Step 3) The embedded network and the GAN are subjected to a joint-training, and then large number of photovoltaic power generation scenarios similar to the real scenario are output, such that the data enhancement is conducted on the time-series data related to the photovoltaic power generation.

(S3) Based on the enhanced time-series data, a distributionally robust optimization model is used to perform capacity configuration of energy storage.

An objective function of the capacity configuration optimization of the energy storage during this stage in the microgrid is determined. In this embodiment, the lowest total cost within the project period is taken as the optimization objective. The objective function is specifically shown as follows:

$$C = C_1 + C_2; \quad (5)$$

$$C_1 = r_e \times C_1' \times \frac{S}{D}; \quad (6)$$

$$r_e = \frac{d(1+d)^y}{365 \times [(1+d)^y - 1]}; \quad (7)$$

$$C_2 = p_{g,t} \times \sum_{t=1}^{T}(V_{chp,t}) + p_t \times \sum_{t=1}^{T}(P_{grid,t}) + \left[\sum_{t=1}^{24}\left(|p_t^c| + |p_t^d|\right)\Delta t \times C_{ess}\right]; \quad (8)$$

where C is the total investment cost of energy storage; $C_1$ indicates the daily average investment cost of energy storage battery; $C_2$ indicates the daily operating cost; $r_e$ indicates the fund recovery factor;

$$C_1'$$

indicates the investment cost per unit capacity of energy storage battery; S indicates energy storage configuration capacity; D indicates the depth of discharge of the energy storage battery; d indicates the discount rate; y indicates the investment life of the energy storage battery; $p_{g,t}$ indicates the price of natural gas at time t; $V_{chp,t}$ indicates the amount of natural gas purchased at time t; $p_t$ indicates the price of purchased electricity at time t; $P_{grid,t}$ indicates the amount of electricity purchased at moment t;

$$p_t^c \text{ and } p_t^d$$

indicate the charging and discharging power of energy storage at moment t, respectively; $C_{ess}$ indicates the cost per unit charge and discharge of the energy storage battery.

The worst-case scenario of the uncertainty of the photovoltaic power generation is described via the distributionally robust optimization, and then the Wasserstein distance is taken as an ambiguity set $M^\varepsilon$ used for measuring the uncertainty of the distributionally robust optimization model. The uncertainty model of the energy storage operation is expressed as follows:

$$M^\varepsilon = \left\{P_{\hat{p}} \in M(\xi): d_W\left(P_{\hat{p}}, \hat{P}\right) \le \varepsilon\right\}; \quad (9)$$

where $P_{\hat{p}}$ is the probability distribution of the actual output power of the photovoltaic power generation; $\hat{P}$ is the empirical distribution of the photovoltaic power generation; $M(\xi)$ is all probability distribution spaces defined by Wasserstein distance $d_W$; ε is radius of the ambiguity set W.

During the operation of the microgrid, all equipment in the microgrid are required to follow the constraints thereof, and the constraints are expressed as follows.

a. An operation constraint of the energy storage equipment is expressed as follows:

$$\begin{cases} SOC_{t+1} = SOC_t(1-\varphi) + \left(p_t^c \cdot \eta - \dfrac{p_t^d}{1-\eta}\right)\Delta t \\ p_{min}^c \le p_t^c \le p_{max}^c \\ p_{min}^d \le p_t^d \le p_{max}^d \\ SOC_{t,min} \le SOC_t \le SOC_{t,max} \end{cases}; \quad (10)$$

where $SOC_t$ is the capacity of a battery at time t; φ is the self-discharging rate of the battery; η is the charging efficiency of the battery;

$$p_t^c$$

is the charging power of the battery at time t;

$$p_t^d$$

is the discharging power of the battery at time t;

$$p_{min}^c$$

is the minimum charging power of the battery;

$$p_{max}^c$$

is the maximum charging power of the battery;

$$p_{min}^d$$

is the minimum discharging power of the battery;

$$p_{max}^d$$

is the maximum discharging power of the battery; and Δt is dispatching time interval.

b. An operation constraint of a gas turbine is expressed as follows:

$$\begin{cases} P_{gt,t} = V_{chp,t} \times J \times \omega \\ H_{gt,t} = V_{chp,t} \times J \times (1-\omega) \\ P_{gt}^{min} \le P_{gt,t} \le P_{gt}^{max} \end{cases}; \tag{11}$$

where $V_{chp,t}$ is the amount of natural gas purchased at time t; ω is the electrical efficiency of the gas turbine; J is the heat value of the natural gas; $H_{gt,t}$ is the thermal power output by the gas turbine at time t;

$$P_{gt}^{min}$$

is the upper limit of electrical power (KW) of the gas turbine; and $$P_{gt}^{max}$$

is the lower limit of the electrical power (KW) of the gas turbine.

c. A constraint of power balance is expressed as follows:

$$\begin{cases} P_{grid,t} + P_{pv,t} + p_t^d - p_t^c + P_{gt,t} = P_{load,t} \\ H_{gt,t} = H_{load,t} \end{cases}; \tag{12}$$

where $P_{grid,t}$ represents the power transmission between the microgrid and the main grid at time t; $P_{pv,t}$ is the power output of the photovoltaic power generation at time t;

$$p_t^c$$

is the charging power of the energy storage battery at time t;

$$p_t^d$$

is the discharging power of the of the energy storage battery at time t, $P_{load,t}$ is the total electrical load demand of the microgrid at time t; $H_{gt,t}$ is the thermal power output of the gas turbine at time t; and $H_{load,t}$ is the total heat load demand of the microgrid at time t.

In conclusion, the distributionally robust optimization model of the capacity configuration of the energy storage is expressed as follows:

$$\begin{cases} \min C = C_1 + C_2 \\ \text{s.t. Equations (10)} - (12) \\ M^{\varepsilon} = \{P_{\hat{p}} \in M(\xi): d_W(P_{\hat{p}}, \hat{P}) \le \varepsilon\} \end{cases}$$

The distributionally robust optimization model of the capacity configuration of the energy storage is solved via a mature commercial solver, so as to obtain the capacity configuration strategy of the energy storage in the microgrid. The mature commercial solvers include Gurobi Optimizer and CPLEX Optimizer.

So far, the whole process of the capacity configuration of the energy storage in the microgrid of this disclosure is completed.

Embodiment 2

In a second aspect, provided herein is a capacity configuration system of energy storage in a microgrid. The system includes a data acquisition and preprocessing module, a time-series generative adversarial network (Time GAN) photovoltaic power generation scenario generation module and an energy storage capacity optimization and output module.

The data acquisition and preprocessing module is configured to acquire time-series data related to photovoltaic power generation and preprocess the time-series data related to the photovoltaic power generation to obtain preprocessed time-series data;

The time-series generative adversarial network (Time GAN) photovoltaic power generation scenario generation module is configured to train the Time GAN to perform data enhancement based on the preprocessed time-series data to obtain enhanced time-series data. The Time GAN includes an embedded network and a generative adversarial network (GAN).

The energy storage capacity optimization and output module is configured to use the distributionally robust optimization model to perform capacity configuration of energy storage based on the enhanced time-series data.

In this embodiment, the time-series data related to the photovoltaic power generation includes photovoltaic power data, global horizontal radiation and diffuse horizontal radiation data, temperature data, and humidity data. The preprocessing includes data cleaning processing, data integration processing, data transformation processing, data reduction processing, and data standardization processing.

In this embodiment, the time-series generative adversarial network (Time GAN) photovoltaic power generation scenario generation module is configured to train the Time GAN to perform data enhancement based on the preprocessed time-series data to obtain enhanced time-series data; the Time GAN includes an embedded network and a generative adversarial network (GAN); the time-series generative adversarial network (Time GAN) photovoltaic power generation scenario generation module is operated through steps of:

(S21) training the embedded network based on the time-series data; and the embedded network is formed by embedding a function used for dimensionality reduction of the time-series data into an autoencoder;

(S22) training a generator and a discriminator in the GAN based on the time-series data; and (S23) performing the data enhancement on the time-series data via joint-training of the embedded network and the GAN.

In this embodiment, the distributionally robust optimization model is shown as follows.

An objective function of the distributionally robust optimization model is expressed as follows:

$$C = C_1 + C_2;$$

$$C_1 = r_e \times C_1' \times \frac{S}{D};$$

$$r_e = \frac{d(1+d)^y}{365 \times [(1+d)^y - 1]};$$

$$C_2 = p_{g,t} \times \sum_{t=1}^{T}(V_{chp,t}) + p_t \times \sum_{t=1}^{T}(P_{grid,t}) + \left[\sum_{t=1}^{24}\left(|p_t^c| + |p_t^d|\right)\Delta t \times C_{ess}\right];$$

where C is the total investment cost of energy storage; $C_1$ indicates the daily average investment cost of energy storage battery; $C_2$ indicates the daily operating cost; $r_e$ indicates the fund recovery factor;

$$C_1'$$

indicates the investment cost per unit capacity of energy storage battery; S indicates energy storage configuration capacity; D indicates the depth of discharge of the energy storage battery; d indicates the discount rate; y indicates the investment life of the energy storage battery; $p_{g,t}$ indicates the price of natural gas at time t; $V_{chp,t}$ indicates the amount of natural gas purchased at time t; $p_t$ indicates the price of purchased electricity at time t; $P_{grid,t}$ indicates the amount of electricity purchased at moment t;

$$p_t^c \text{ and } p_t^d$$

indicate the charging and discharging power of energy storage at moment t, respectively; $C_{ess}$ indicates the cost per unit charge and discharge of the energy storage battery.

Constraints of the objective function are shown as follows.

a. An operation constraint of energy storage equipment is expressed as follows:

$$\begin{cases} SOC_{t+1} = SOC_t(1-\varphi) + \left(p_t^c \cdot \eta - \frac{p_t^d}{1-\eta}\right)\Delta t \\ p_{min}^c \le p_t^c \le p_{max}^c \\ p_{min}^d \le p_t^d \le p_{max}^d \\ SOC_{t,min} \le SOC_t \le SOC_{t,max} \end{cases};$$

where $SOC_t$ is the capacity of the battery at time t; φ is the self-discharging rate of the battery; η is the charging efficiency of the battery;

$$p_t^c$$

is the charging power of the battery at time t;

$$p_t^d$$

is the discharging power of the battery at time t;

$$p_{min}^c$$

is the minimum charging power of the battery;

$$p_{max}^c$$

is the maximum charging power of the battery;

$$p_{min}^d$$

is the minimum discharging power of the battery;

$$p_{max}^d$$

is the maximum discharging power of the battery; and Δt is dispatching time interval.

b. an operation constraint of a gas turbine is expressed as follows:

$$\begin{cases} P_{gt,t} = V_{chp,t} \times J \times \omega \\ H_{gt,t} = V_{chp,t} \times J \times (1-\omega) \\ P_{gt}^{min} \leqslant P_{gt,t} \leqslant P_{gt}^{max} \end{cases};$$

where $V_{chp,t}$ is the amount of natural gas purchased at time t; ω is the electrical efficiency of the gas turbine; J is the heat value of the natural gas; $H_{gt,t}$ is the thermal power output by the gas turbine at time t;

$$P_{gt}^{min}$$

is the upper limit of electrical power of the gas turbine; and $$P_{gt}^{max}$$

is the lower limit of the electrical power of the gas turbine.

c. A constraint of power balance is expressed as follows:

$$\begin{cases} P_{grid,t} + P_{pv,t} + p_t^d - p_t^c + P_{gt,t} = P_{load,t} \\ H_{gt,t} = H_{load,t} \end{cases};$$

where $P_{grid,t}$ represents the power transmission between the microgrid and the main grid at time t; $P_{pv,t}$ is the power output of the photovoltaic power generation at time t;

$$p_t^c$$

is the charging power of the energy storage battery at time t;

$$p_t^d$$

is the discharging power of the of the energy storage battery at time t, $P_{load,t}$ is the total electrical load demand of the microgrid at time t; $H_{gt,t}$ is the thermal power output of the gas turbine at time t; and $H_{load,t}$ is the total heat load demand of the microgrid at time t.

An ambiguity set $M^{\varepsilon}$ used for measuring an uncertainty of the distributionally robust optimization model is shown as follows:

$$M^{\varepsilon} = \{P_{\hat{p}} \in M(\xi): d_W(P_{\hat{p}}, \hat{P}) \leq \varepsilon\};$$

where $P_{\hat{p}}$ is the probability distribution of the actual output power of the photovoltaic power generation; $\hat{P}$ is the empirical distribution of the photovoltaic power generation; $M(\xi)$ is all probability distribution spaces defined by Wasserstein distance $d_W$; $\varepsilon$ is radius of the ambiguity set W.

In an embodiment, the distributionally robust optimization model is configured to perform the capacity configuration of energy storage, which is operated through a step of:

solving the distributionally robust optimization model by a commercial solver to obtain a solution result; and performing the capacity configuration of energy storage based on the solution result.

Compared with the prior art, this application has the following beneficial effects.

1. With regard to the method and the system provided herein, the time-series data related to photovoltaic power generation is acquired and processed to obtain the preprocessed time-series data; a time-series generative adversarial network (Time GAN) is trained based on the preprocessed time-series data to perform data enhancement to obtain enhanced time-series data; and based on the enhanced time-series data, a distributionally robust optimization model is used to perform capacity configuration of energy storage. The Time GAN is configured to perform data enhancement on the limited data obtained by the newly-built microgrid, so as to allow the capacity of energy storage of the newly-built microgrid to be accurately configured using the distributionally robust optimization model when the data is severely insufficient, improving the utilization efficiency of the data and the construction efficiency of the microgrid.

2. Compared with ordinary generative adversarial network (GAN), the Time GAN provided herein is configured to perform data enhancement, which considers not only the static characteristics of time-series data, but also the time characteristics of the data.

3. The distributionally robust optimization model is configured to perform the capacity configuration of energy storage, which takes the uncertainties of the photovoltaic power, allowing the capacity configuration of energy storage more accurate, lowering the construction cost of the microgrid, and enhancing the security performance of the microgrid during operation.

It should be noted that as used herein, relational terms such as "first" and "second" are merely intended to distinguish one entity or operation from another entity or operation, and do not necessarily require or imply such an actual relationship or order between these entities or operations. Furthermore, the term "comprise", "include", "contain" or any other variations are intended to encompass a non-exclusive inclusion, such that a process, method, article, or instrument not only includes those listed elements, but also includes those that are not clearly listed, or those elements that are inherent to such a process, method, article, or instrument. If there are no more restrictions, the elements defined by the sentence "comprising . . . " do not exclude the existence of other identical elements in the process, method, article, or instrument comprising the elements.

Described above are merely described to illustrate the technical solutions of this disclosure, but not intended to limit this disclosure. It should be understood for those of ordinary skill in the art that any modifications of the technical solutions described in the above embodiments or the equivalent replacement of the part of the technical features can be made without departing from the spirit of the application should still fall within the scope of the present application defined by the appended claims.

What is claimed is:

1. An electronic device, comprising:

one or more processors;

a memory; and one or more programs, wherein the one or more programs are stored in the memory and configured to be executed by the one or more processors, and the programs may be configured to execute methods, comprising, acquiring, by one or more sensors and one or more data collectors, time-series data related to photovoltaic power generation, and performing, by the one or more processors, preprocessing of the time-series data to obtain preprocessed time-series data;

training a time-series generative adversarial network (Time GAN) based on the preprocessed time-series data to perform data enhancement to obtain enhanced time-series data; wherein the Time GAN comprises an embedded network and a generative adversarial network (GAN); and based on the enhanced time-series data, performing capacity configuration of energy storage by using a distributionally robust optimization model; and the distributionally robust optimization model comprises:

an objective function of the distributionally robust optimization model is expressed as follows:

$$C=C_1+C_2;$$

$$C_1=r_e\times C_1'\times\frac{S}{D};$$

$$r_e=\frac{d(1+d)^y}{365\times[(1+d)^y-1]};$$

$$C_2=p_{g,t}\times\sum_{t=1}^{T}(V_{chp,t})+p_t\times\sum_{t=1}^{T}(P_{grid,t})+\left[\sum_{t=1}^{24}(|p_t^c|+|p_t^d|)\Delta t\times C_{ess}\right];$$

wherein C is a total investment cost of energy storage; $C_1$ indicates a daily average investment cost of energy storage battery; $C_2$ indicates a daily operating cost; $r_e$ indicates a fund recovery factor;

$$C_1'$$

indicates an investment cost per unit capacity of energy storage battery; S indicates energy storage configuration capacity; D indicates a depth of discharge of the energy storage battery; d indicates a discount rate; y indicates an investment life of the energy storage battery; $p_{g,t}$ indicates a price of natural gas at time t; $V_{chp,t}$ indicates the amount of natural gas purchased at time t; $p_t$ indicates a price of purchased electricity at time t; $P_{grid,t}$ indicates the amount of electricity purchased at moment t;

$$p_t^c \text{ and } p_t^d$$

indicate charging anu discharging power of energy storage at moment t, respectively; and $C_{ess}$ indicates a cost per unit charge and discharge of the energy storage battery; constraints of the objective function comprise:

a. an operation constraint of energy storage equipment is expressed as follows:

$$\begin{cases} SOC_{t+1}=SOC_t(1-\varphi)+\left(p_t^c\cdot\eta-\frac{p_t^d}{1-\eta}\right)\Delta t \\ p_{min}^c\le p_t^c\le p_{max}^c \\ p_{min}^d\le p_t^d\le p_{max}^d \\ SOC_{t,min}\le SOC_t\le SOC_{t,max} \end{cases};$$

wherein $SOC_t$ is a capacity of a battery at time t; φ is a self-discharging rate of the battery; η is a charging efficiency of the battery;

$$p_t^c$$

is a charging power of the battery at time t;

$$p_t^d$$

is a discharging power of the battery at time t;

$$p_{min}^c$$

is a minimum charging power of the battery;

$$p_{max}^c$$

is a maximum charging power of the battery;

$$p_{min}^d$$

is a minimum discharging power of the battery;

$$p_{max}^d$$

is a maximum discharging power of the battery; and Δt is dispatching time interval;

b. an operation constraint of a gas turbine is expressed as follows:

$$\begin{cases} P_{gt,t}=V_{chp,t}\times J\times\omega \\ H_{gt,t}=V_{chp,t}\times J\times(1-\omega) \\ P_{gt}^{min}\le P_{gt,t}\le P_{gt}^{max} \end{cases};$$

wherein $V_{chp,t}$ is the amount of natural gas purchased at time t; ω is an electrical efficiency of the gas turbine; J is a heat value of the natural gas; $H_{gt,t}$ is a thermal power output by the gas turbine at time t;

$$P_{gt}^{min}$$

is a lower limit or electrical power of the gas turbine, and $$P_{gt}^{max}$$

is an upper limit of the electrical power of the gas turbine;

c. a constraint of power balance is expressed as follows:

$$\begin{cases} P_{grid,t}+P_{pv,t}+p_t^d-p_t^c+P_{gt,t}=P_{load,t} \\ H_{gt,t}=H_{load,t} \end{cases};$$

wherein $P_{grid,t}$ represents the power transmission between the microgrid and a main grid at time t; $P_{pv,t}$ is a power output of the photovoltaic power generation at time t;

$$p_t^c$$

is a charging power of an energy storage battery at time t;

$$p_t^d$$

is a discharging power of the of the energy storage battery at time t, $P_{load,t}$ is a total electrical load demand of the microgrid at time t; $H_{gt,t}$ is a thermal power output of the gas turbine at time t; and $H_{load,t}$ is a total heat load demand of the microgrid at time t; and an ambiguity set $M^{\varepsilon}$ used for measuring an uncertainty of the distributionally robust optimization model is shown as follows:

$$M^{\varepsilon} = \{P_{\hat{p}} \in M(\xi): d_W(P_{\hat{p}}, \hat{P}) \leq \varepsilon\};$$

wherein $P_{\hat{p}}$ is a probability distribution of an actual output power of the photovoltaic power generation; $\hat{P}$ is an empirical distribution of the photovoltaic power generation; $M(\xi)$ is all probability distribution spaces defined by Wasserstein distance $d_W$; and $\varepsilon$ is radius of an ambiguity set W; and wherein the step of using a distributionally robust optimization model to perform capacity configuration of energy storage comprises:

solving the distributionally robust optimization model by the one or more processors to obtain a solution result comprising the energy storage configuration capacity;

transmitting the solution result to an energy management system of the microgrid; and performing, by the energy management system, the capacity configuration of energy storage based on the solution result;

the performing capacity configuration of energy storage comprises configuring at least one of energy storage configuration capacity, a charging power of the energy storage, a discharging power of the energy storage, state of charge limits of the energy storage and charge and discharge limits of the energy storage.

2. The electronic device of claim 1, wherein the time-series data related to the photovoltaic power generation comprises photovoltaic power data, global horizontal radiation and diffuse horizontal radiation data, temperature data, and humidity data; the preprocessing comprises data cleaning processing, data integration processing, data transformation processing, data reduction processing, and data standardization processing.

3. The electronic device of claim 2, wherein the step of training a time-series generative adversarial network (Time GAN) based on the preprocessed time-series data to perform data enhancement to obtain enhanced time-series data comprises:

training the embedded network based on the time-series data; and the embedded network is formed by embedding a function used for dimensionality reduction of the time-series data into an autoencoder;

training a generator and a discriminator in the GAN based on the time-series data; and performing the data enhancement on the time-series data via joint-training of the embedded network and the GAN.

* * * * *